D. I. CORKER.
Harrow.
No. 215,577. Patented May 20, 1879.
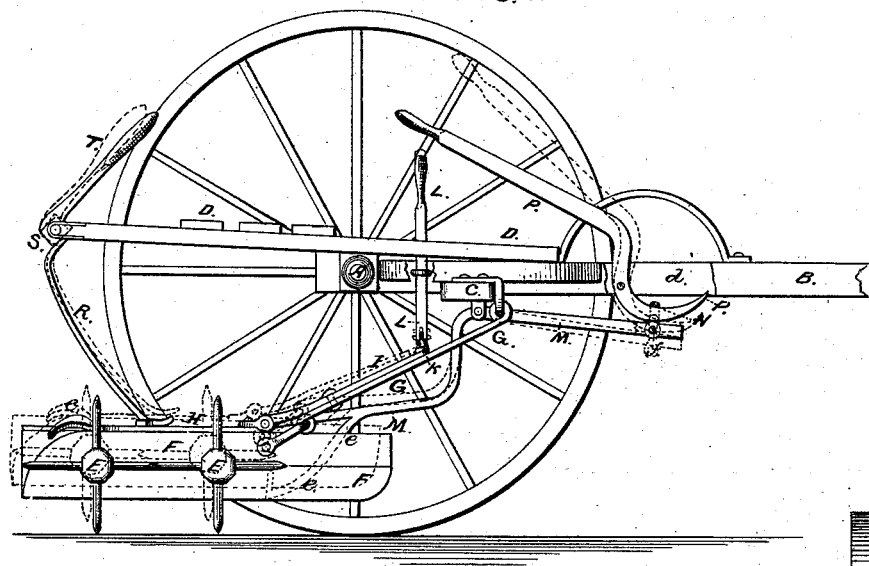
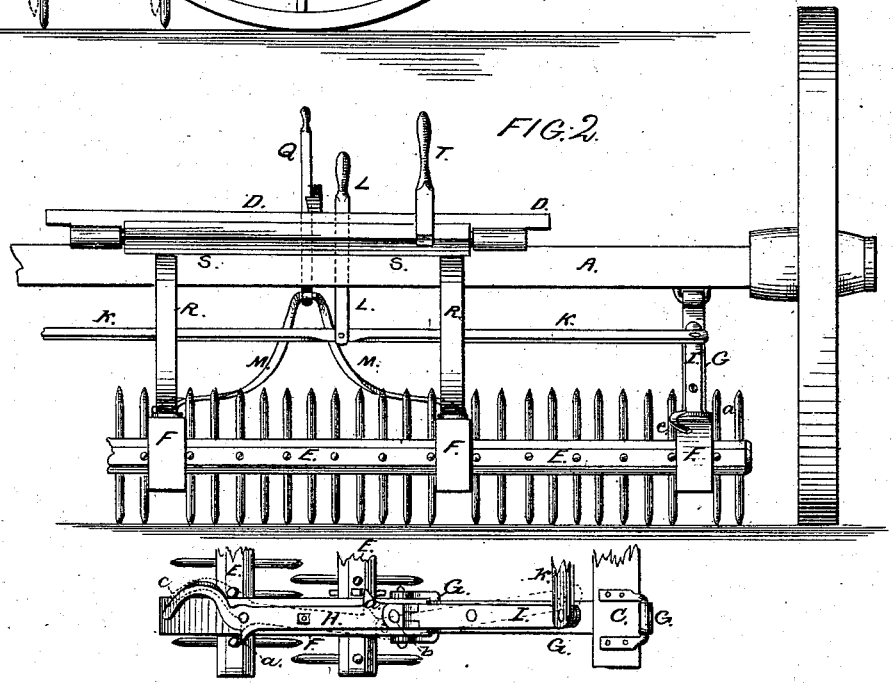
WITNESSES: INVENTOR:

UNITED STATES PATENT OFFICE.

DAVID I. CORKER, OF AMITY, OREGON.

IMPROVEMENT IN HARROWS.

Specification forming part of Letters Patent No. 215,577, dated May 20, 1879; application filed December 30, 1878.

*To all whom it may concern:*

Be it known that I, DAVID I. CORKER, of Amity, in the county of Yam Hill and State of Oregon, have invented a new and Improved Harrow; and I do hereby declare that the following is a full, clear, and exact description of the same.

The invention is an improvement in the class of harrows having spiked cylinders, which are so arranged as to rotate when their spikes are released from engagement with a notched bar, thereby freeing the spikes from adhering stubble.

My improvement relates to the use of pivoted locking-bars which will engage with or release the spikes of two cylinders simultaneously, so as to arrest or allow their rotation simultaneously.

The invention further relates to the construction and arrangement of parts for raising the cylinders off the ground when not required to be in action.

In the accompanying drawings, Figure 1 is a side view of the machine, with one of the wheels removed. Fig. 2 is a rear view of a portion of the machine. Fig. 3 is a detail plan view, showing the device for locking the toothed rollers.

The frame of the machine consists of the axle A, tongue B, cross-bar C, and platform D, which are all rigidly connected.

The harrow proper consists of spiked cylinders or rollers E E, which have their bearings in drag-bars F, and are rotated by contact of their spikes with the ground. The drag-bars F are connected to the bar C by stay-bars G, which are suitably hinged to allow the drag-bars and toothed rollers free vertical movement.

A bar, H, provided with lugs or shoulders $a$ on each of its sides, is pivoted, in the middle of its length, to each of the end drag-bars, F, and is connected, by a universal joint, $b$, with levers I, which are similarly pivoted to the stay-bars G. The upper ends of the two levers I are connected by a bar, K, which may be shifted or adjusted endwise by a hand-lever, L, for the purpose of vibrating the levers I.

When the machine is at work the rollers E E are locked and prevented from rotating by the engagement of their teeth with the shoulders or lugs $a$ of the bars H.

When the harrow-teeth become clogged with moist earth, or with stubble, grass, &c., the driver shifts the upper end of hand-lever L to the left, thereby throwing the levers I and the locking-bars H, which are connected therewith, into such position that the lugs $a$ release the teeth and allow the rollers E to rotate until one of the teeth of the succeeding row strikes the tail-piece or curved rear end, $c$, of the locking-bars H, and moves the latter back into the original position, so that the lugs $a$ lock the rollers, as before.

To the front ends of the middle drag-bars, F, are hinged long curved levers M, which are brought together and pivoted to the frame-bar C, and thence extend forward to a slot, $d$, in the tongue B, where they are connected by a ring or link, N, to the curved short arm of an angular hand-lever, P, which is pivoted in said slot. By raising the long arm of said lever P the curved portion will depress the front ends of levers M, and thereby raise the harrows E E off the ground. In such operation the downward extension or arm $e$ of the levers M presses against the front ends of the drag-bars F.

To lessen the friction between the levers M and hand-lever P, I place a roller, $f$, between the front ends of the former.

In order that the driver may hold the harrows down and increase the pressure on them at will, I provide a lever consisting of spring-arms R, a roller, S, and handle T. The roller S is journaled in the rear end of the platform D, and the arms R are pendent therefrom. The lower ends of the arms R are curved, to adapt them to rest on the drag-bars.

I am aware that a toothed rotating roller has been locked by a notched bar which revolves on its axis.

What I claim is—

1. The combination, with the drag-bars and toothed rollers, of the flat bars H, which have notches in opposite sides, and are pivoted at or about the middle of their length and between the journals of said rollers, to adapt them to lock with both, as shown and described.

2. The pivoted locking-bar H, provided with lugs or shoulders $a$ and the curved tail-piece $c$, in combination with a toothed roller and drag-bars or frame, in which said roller is journaled, as specified.

3. The combination of hand-lever L, the shifting connecting-bar K, the pivoted levers I and locking-bars H, the stay-bars, draft-bars, and toothed rollers, as shown and described.

4. The curved lever M, having arms $e$, and pivoted to the drag-bars F and frame-bar C, the toothed rollers E, the hinged stay-bars, and lever P, all as shown and described.

D. I. CORKER.

Witnesses:
C. SMITH,
R. L. SIMPSON.